United States Patent [19]

Mazarguil et al.

[11] 4,061,828

[45] Dec. 6, 1977

[54] MODIFIED, GRAFTED MINERAL CARRIERS

[75] Inventors: Honore Mazarguil, Ramonville Saint Agne; Francois Meiller, Palaiseau; Pierre Monsan, Toulouse, all of France

[73] Assignee: Rhone-Poulenc Industries, Paris, France

[21] Appl. No.: 670,899

[22] Filed: Mar. 26, 1976

[30] Foreign Application Priority Data

Apr. 4, 1975 France ................. 75.10597

[51] Int. Cl.$^2$ .................. B32B 19/02; B05D 7/00; B05D 7/24
[52] U.S. Cl. .................. 428/403; 427/214; 427/220; 427/387; 428/407; 428/429; 428/447; 260/37 R

[58] Field of Search ............. 427/215, 219, 220, 221, 427/387, 214; 428/403, 402, 404, 405, 429, 447, 454; 106/308 R, 308 M; 260/37 R, 37 SB, 42.15

[56] References Cited

U.S. PATENT DOCUMENTS

| 2,841,566 | 7/1958 | Grotenhuis | 260/42.15 X |
|---|---|---|---|
| 3,833,366 | 9/1974 | Madrid et al. | 428/405 X |
| 3,963,627 | 6/1976 | Cottrell | 428/405 X |
| 3,969,261 | 7/1976 | Meiller | 428/447 X |

*Primary Examiner*—Thomas J. Herbert, Jr.
*Assistant Examiner*—R. Eugene Varndell, Jr.
*Attorney, Agent, or Firm*—McDougall, Hersh & Scott

[57] ABSTRACT

The invention concerns mineral carriers carrying modified silicon grafts. They comprise mineral carriers grafted by silicon derivatives with aromatic amino substituents, modified by substituted or unsubstituted adenine radicals. The carriers are used in chromatography and more particularly in affinity chromatography for the purification of enzymes.

7 Claims, No Drawings

MODIFIED, GRAFTED MINERAL CARRIERS

The invention concerns mineral carriers which are grafted by silicon derivatives and modified, particularly for use in affinity chromatography.

Affinity chromatography is a known method of separation and purification which is applied particularly to enzymes. In this case it comprises fixing either enzymes or impurities, by specific, reversible bonds, onto carriers represented by organic gels, such as modified polyacrylamide or dextran, then detaching the enzyme or impurities from the carrier by modifying the elution conditions of the medium.

However, the gels used have some disadvantages. They are unstable and have little resistance to heat, pressure and microorganisms; this shortens their useful life and makes them less effective.

The modified, grafted carriers according to the invention avoid these disadvantages. They are stable and resistant to heat, pressure and microorganisms, and they make it possible for enzymes to be separated, without difficulty, from mixtures with other inactive proteins and obtained in a very pure state.

The carriers, according to the invention, are mineral ones, carrying silicon grafts with aromatic amino substituents; they are distinctive in that they are modified by substituted or unsubstituted adenine radicals.

The carriers are obtained by reacting a mineral carrier having hydroxyl groups with a silicon compound, one of the substituents of which is an aromatic amino radical, the silicon compound having 1 to 3 groups adapted to react with the hydroxyl groups of the carrier, carrying out the diazotization of the graft and then the reaction between the product obtained and the adenine or its derivatives.

Although the reaction whereby silicon radicals are fixed on carriers in known per se, the mineral carriers and the compounds to be grafted must, for purposes of the invention, have specific properties.

Thus the mineral carrier used must have hydroxyl groups and must have a grain size from 40 μ m to 2.5 mm, a specific surface area of 1 to 600 m²/g, a pore diameter of the order of 40 to 10,000 A, and a pore volume of 0.5 to 1.8 ml/g. It is represented by aluminas, brick, mineral silicates, metal oxides and more particularly silicas.

The silicon compound to be grafted is of the general formula

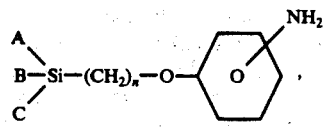

wherein A, B and C, which may be similar or different, represent a methoxy, ethoxy, methyl or ethyl group, provided that at least one of them is capable of reacting with an OH group in the mineral carrier; n is a whole number of from 2 to 4.

Other substances which may be grafted are polymers and copolymers derived from silanes with 2 or 3 hydrolyzable groups as described above.

The grafting reaction may be carried out by any known method in a solvent or aqueous medium, at atmospheric pressure or under pressure and generally with heat.

Diazotization, which is known per se, is obtained by way of conventional methods and preferably by reacting the grafted carrier with sodium nitrite, cold, in a hydrochloric medium.

Apart from adenine, which can be fixed onto grafted carriers, use can also be made of its derivatives such as: adenosine, adenosine monophosphate (AMP), adenosine diphosphate (ADP), adenosine triphosphate (ATP), adenylyl-imidodiphosphate (AMPPNP), coenzyme A, flavine adenine dinucleotide (FAD), nicotinamide adenine dinucleotide (NAD), deoxyribonucleic acid (ADN) and ribonucleic acid (RNA).

The reaction, whereby adenine or its derivatives are fixed onto the diazotized grafted carrier, is preferably carried out in an aqueous or dilute alcoholic medium which can dissolve the adenine or its derivatives and which has an alkaline pH level. The reaction should preferably be carried out at a temperature which does not exceed room temperature, and possibly in an inert atmosphere.

The grafted or modified carriers obtained are used in chromatography and more particularly in affinity chromatography for the purification of enzymes. The choice of the carrier, the graft and particularly the adenine or its derivatives depends on the nature of the enzyme to be purified.

Some examples of the invention will now be given. These are given by way of illustration and not by way of limitation of the invention.

EXAMPLE 1

Fixing of adenine 100 g of a silica in the form of microspheres, with a grain size of 100–200 μ m, a specific surface area of 50 m²g, a pore volume of 1.04 ml/g and an average pore diameter of 600 μ m, is dried at 150° C under vacuum for 4 hours.

The dried silica is then put into contact for 6 hours at 140° C with 10 g of silane having the formula

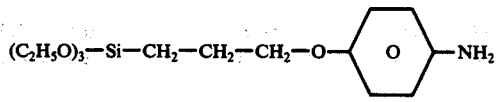

dissolved in 250 ml of xylene. After cooling, the liquid is drained off and the remaining solid is washed in acetone and dried. The grafted silica obtained contains 0.2% of nitrogen.

3 g of the silica obtained is put into suspension in 10 ml of N hydrochloric acid and placed in a bath of ice, the suspension being maintained by magnetic agitation. 10 ml of an aqueous solution of 0.2 M sodium nitrite is then added rapidly and left in contact for 7 minutes.

After separation, the diazotized carrier is washed with N hydrochloric acid, drained, then introduced into 85 ml of a cold, 50% ethanol solution of 0.1 M sodium borate, pH 8.2, containing 113.2 mg (839 μ moles) of adenine.

The reaction mixture is kept under agitation and returned to pH 8.2 by the addition of normal caustic soda. It is then left at 4° C, under nitrogen, for 24 hours. The treated carrier is then separated and washed with ethyl alcohol.

The mixture of fixing and washing solutions is brought to pH 8.2 and dosed by UV at 260 n m; it contains 67.4 mg of adenine.

15.97 mg of adenine are fixed by covalent bond per gram of carrier.

No desorption by elution is observed with the passage of time.

EXAMPLE 2

Fixing of adenylyl-imidodiphosphate (AMPPNP)

The procedure is the same as in Example 1, except that the 3 g of diazotized carrier is washed with iced water to bring the carrier to a pH of about 6; it is then treated with 100 ml of a solution comprising 10% by volume of 0.05 M phosphate buffer, pH 8.6 and 90% ethanol, with 12 mg of AMPPNP dissolved in it.

UV testing at 260 n m shows 7.77 mg of AMPPNP to be fixed on the 3 g of carrier.

Additional washes do not contain AMPPNP in quantities which can be measured by U.V. This demonstrates the stability of the modified carrier.

EXAMPLE 3

Fixing of deoxyribonucleic acid (ADN)

Two tests are carried out simultaneously, with a nascent ADN and a partially denatured ADN respectively. 2.6 g of silica, grafted by the same silane as in Example 1, is suspended in 10 ml of 2 N hydrochloric acid and cooled in a bath of ice. 10 ml of an aqueous solution, containing 0.2 g of sodium nitrate, is added to the agitated suspension and left in contact for 10 minutes. After separation, the diazotized carrier is washed twice with 20 ml of 2 N hydrochloric acid and 3 times with 20 ml of iced water, then drained.

The carrier is then put into contact with 10 ml of a 1 mg/ml solution of ADN in a 0.2 phosphate buffer, pH 7.5, containing 0.02 M of sodium azide.

The quantity of ADN fixed is determined by UV measurement at 260 nm. It is 3 mg of nascent ADN and 6.5 mg of denatured ADN.

EXAMPLE 4

Fixing of nicotinamide adenine dinucleotide (NAD+).

400 g of spheres of silica hydrogel, containing 75% of water, is put into contact with 62 g of silane having the formula

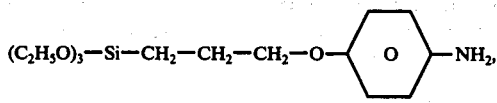

in 800 ml of benzene.

The mixture is then heated to boiling temperature, until 300 ml of water has been eliminated by azeotropy. After cooling, the silica is drained (liquid drawn off), washed with acetone and dried. Its specific surface area is 410 m²g, its pore volume 1.1 ml/g and its nitrogen content 2.1%.

3 g of the silica obtained is suspended in 10 ml of 2 N hydrochloric acid. 20 ml of an aqueous solution of 0.1 N sodium nitrite is added to the mixture at 0° C and left in contact for 15 minutes. After separation, the carrier is washed 3 times with 10 ml of a cold solution of 2 N hydrochloric acid in a mixture of equal quantities of alcohol and water, and once with 50 ml of iced, distilled water.

The carrier obtained is fed into a 0.1 M buffer solution, pH 8.6, containing 11 mg of NAD+ and is left thus for 24 hours at ambient temperature. The carrier gradually takes on a slightly orange color.

Measurements taken by optical density in UV make it possible to determine the quantity of NAD+ fixed, by establishing the difference between the quantity used and the quantity recovered in the fixing and washing solutions. The quantity fixed is 2.5 mg of NAD+ per gram of carrier.

The carrier with the NAD fixed on it is fed into a column for chromatography, and it is balanced at pH 6 by passing 50 ml of a 0.05 M buffer solution at pH 6. The column is then cooled to 10° C and kept at that temperature.

300 μ 1 of a buffer solution at pH 6, containing 5 mg of bovine albumin and 2.5 mg of dehydrogenase alcohol, is then circulated alone at the same speed. Absorption of the washings is followed continuously at 280 nm by UV; the volume of the proportions collected is 1 ml.

The first peak, corresponding virtually to the empty volume of the column, shows that 96.5% of the albumin introduced is being recovered. No enzyme activity, corresponding to the dehydrogenase alcohol, is observed.

Introduction of a linear gradient up to pH 8.6 enables 3.5% of the missing albumin to be recovered without any enzyme activity being observed.

Introduction of NAD+ into the elution buffer in a concentration of 3.4 10⁻³M makes it possible to recover the dehydrogenase alcohol corresponding to 70% of the initial activity.

An increase in the concentration of NAD+ to 10⁻² M does not make it possible to wash out the dehydrogenase alcohol corresponding to the missing activity.

We claim:

1. A method of preparing carriers comprising grafting onto a mineral carrier, a silicon derivative, diazotizing the grafted mineral carrier, and then fixing adenine or its derivative onto the diazotized grafted mineral carrier in which the silicon derivative to be grafted is of the general formula

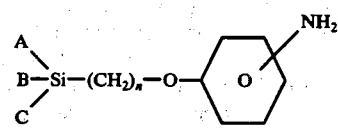

wherein A, B and C, which may be similar or different, are selected from the group consisting of methoxy, ethoxy, methyl or ethyl, provided that at least one of them is reactive with an OH group in the mineral carrier, $n$ being a whole number with a value from 2 to 4.

2. A method of preparing carriers of claim 1, comprising grafting onto a mineral carrier a silicon derivative having an aromatic amino radical as a substituent, diazotizing the grafting mineral carrier, and then fixing adenine or its derivative onto the diazotized grafted mineral carrier.

3. A method according to claim 1, in which the mineral carrier has hydroxyl groups and has a grain size of 40 μ m to 2.5 nm, a specific surface area of 1 to 600 m²/g, a pore diameter of 40 to 10,000 A and a pore volume of 0.5 to 1.8 ml/g.

4. A method according to claim 1 in which the silicon derivative to be grafted is a polymer or copolymer of the silane.

5. A method according to claim 1, in which the adenine derivative is selected from the group consisting of adenosine, adenosine monophosphate, adenosine diphosphate, adenosine triphosphate, adenylyl-imidodiphosphate, coenzyme A, flavine adenine dinucleotide, nicotinamide adenine dinucleotide, deoxyribonucleic acid and ribonucleic acid.

6. A method according to claim 1, in which the adenine or its derivatives are fixed on the diazotized grafted carrier in a medium adapted to dissolve the adenine or its derivatives, at an alkaline pH and at a temperature which does not exceed room temperature.

7. Mineral carriers grafted with silicon derivatives having aromatic amino substituents in which the silicon derivative has the general formula

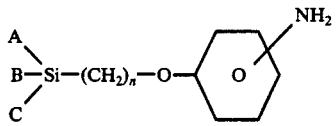

wherein A, B and C, which may be similar or different, are selected from the group consisting of methoxy, ethoxy, methyl or ethyl, provided that at least one of them is reactive with an OH group in the mineral carrier, $n$ being a whole number with a value from 2 to 4, and said grafts modified by substituted or unsubstituted adenine radicals.

* * * * *

UNITED STATES PATENT AND TRADEMARK OFFICE
CERTIFICATE OF CORRECTION

PATENT NO. : 4,061,828

DATED : December 6, 1977

INVENTOR(S) : Honore Mazarguil, Francois Meiller and Pierre Monsan

It is certified that error appears in the above-identified patent and that said Letters Patent are hereby corrected as shown below:

Column 4, line 16, after "circulated" the following has been omitted:  --at 3 ml/hour, then the same buffer solution is circulated--.

Signed and Sealed this

Eighteenth Day of July 1978

[SEAL]

Attest:

RUTH C. MASON
Attesting Officer

DONALD W. BANNER
Commissioner of Patents and Trademarks